United States Patent
Floegel et al.

(12)

(10) Patent No.: US 6,284,339 B1
(45) Date of Patent: *Sep. 4, 2001

(54) ELECTRET FILM COMPOSITION ADAPTED FOR PRINTING ON COMPUTER PRINTERS AND THE LIKE

(75) Inventors: Jack E. Floegel, Albuquerque, NM (US); Calvin Ward, Castro Valley, CA (US)

(73) Assignee: Permacharge Corporation, Rio Rancho, NM (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/985,663

(22) Filed: Dec. 9, 1997

(51) Int. Cl.⁷ ................................................. B65D 65/28
(52) U.S. Cl. ............................ 428/43; 40/514; 101/212; 101/487; 101/489; 428/194; 428/411.1; 428/515; 428/516; 428/520; 428/922; 434/412; 434/413; 434/426

(58) Field of Search ............................ 428/43, 194, 520, 428/516, 515, 922, 411.1; 40/594, 514; 434/412, 413, 426; 101/489, 487, 212, DIG. 37

(56) References Cited

U.S. PATENT DOCUMENTS

| | | | | |
|---|---|---|---|---|
| 4,513,049 | * | 4/1985 | Yamasaki | 428/194 |
| 5,207,581 | * | 5/1993 | Boyd | 434/412 |
| 5,477,784 | * | 12/1995 | Floegel | 101/489 |
| 5,904,985 | * | 5/1999 | Ward | 428/411.1 |

* cited by examiner

*Primary Examiner*—Nasser Ahmad
(74) *Attorney, Agent, or Firm*—Calvin B. Ward

(57) ABSTRACT

A printing composition that is adapted for printing on computer printers and the like. The printing composition includes a backing sheet and a printing sheet. The printing sheet includes an electret which is reversibly bound to the backing sheet. In one embodiment of the invention, the printing sheet is coated with an ink absorbing coating. The electret can be constructed from materials such as polypropylene or polyethylene that have been subjected to electrostatic fields.

8 Claims, 1 Drawing Sheet

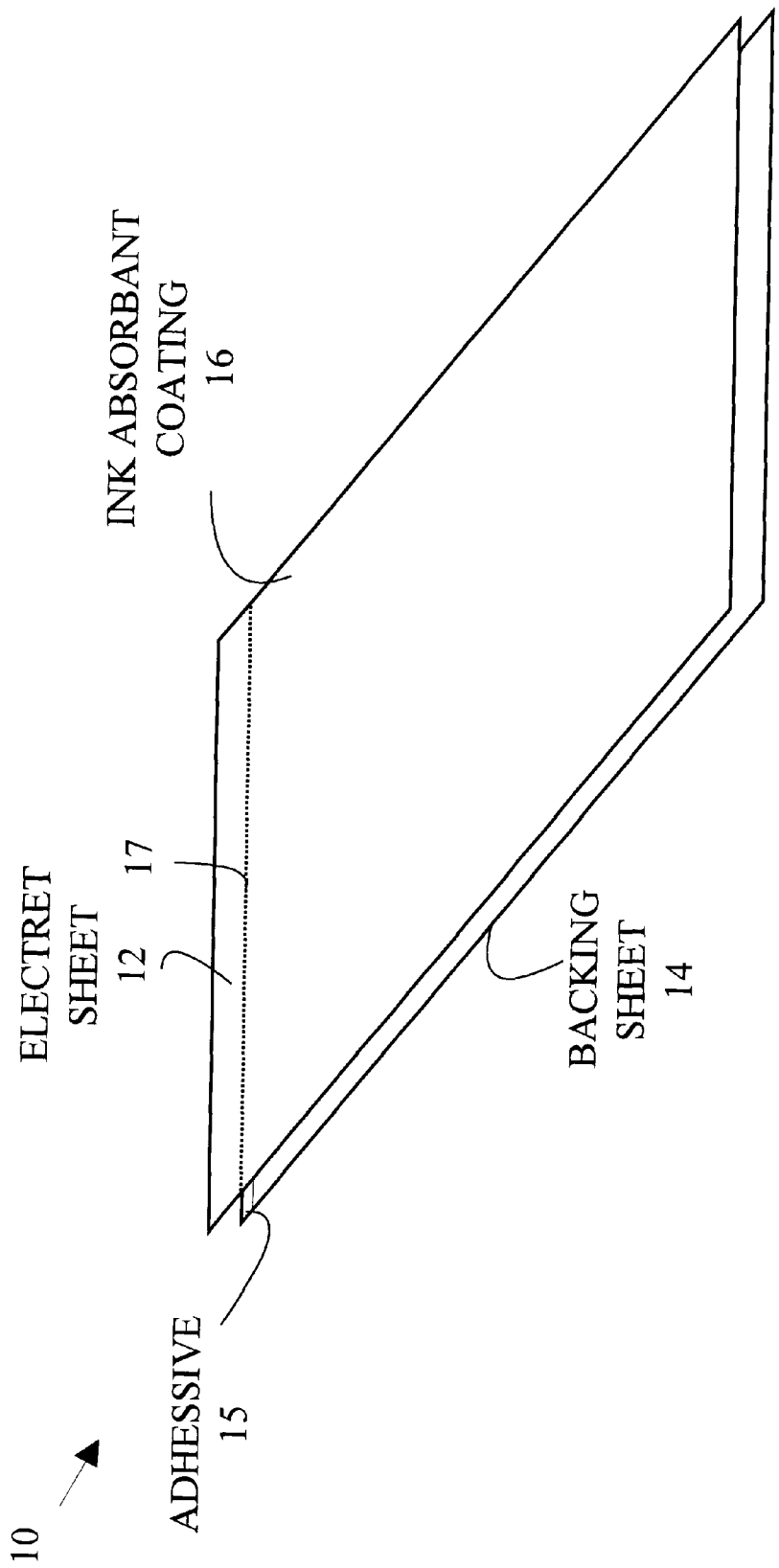

ELECTRET FILM COMPOSITION ADAPTED FOR PRINTING ON COMPUTER PRINTERS AND THE LIKE

FIELD OF THE INVENTION

The present invention relates to computer printers and printing materials for use therein, and more particularly, to a computer printing material that will adhere electrostatically to surfaces.

BACKGROUND OF THE INVENTION

Modern desktop publishing has made possible the production of one of a kind posters and other displays. A user of a conventional personal computer equipped with any one of a number of inexpensive printers can create professional quality artwork and displays. If the user also has access to a scanner, the user can input almost any type of artwork and modify the artwork for inclusion in the user's own creation.

While the ability to generate custom artwork has advanced rapidly, the ability to "hang" the art work has not progressed so rapidly. The options for displaying the artwork can be more or less summarized as "glue", "frame", or "project". Framing is not cost effective for many temporary displays. In addition, the frame must be mounted on the surface by a fastener or the like. Such fasteners can damage the surface. Such damage is particularly objectionable if the artist is renting the premises at which the damage occurs.

Transparency materials for use with overhead projectors have been available for some time. Unfortunately, one needs a projector for each display. While such systems are practical for presentations to groups in business or educational settings, these systems are far from adequate in terms of serving the needs of an artist or teacher who wishes to hang a picture on a wall. Furthermore, the number of pictures that can be displayed at a time is limited to one per projector.

Printer compatible papers with glue backing are also known to those skilled in the publishing arts. These vary in sizes from small printer labels to full sized sheets. An art work printed on an adhesive backed sheet may be stuck to a surface without the need to frame the art work or damage the surface by the application of fasteners. Unfortunately, such adhesive backed sheets have a number of problems. First, the artwork cannot, in general, be removed from one location and re-applied at another location more than a few times without the adhesive failing. In addition, some of the adhesives used in these sheets leave a residue on the surface. Furthermore, the adhesives used with some of these papers, such as those used for labels, are sufficiently strong that the paper may not be removed from surfaces such as glass without destroying the artwork. In some cases, the art work must be scraped from the surface using a razor blade or the like.

One type of material that holds the promise of providing a display which sticks to a surface without the use of fasteners or adhesives is the electrets. For the purposes of the present discussion, an electret will be defined to be a plastic sheet which carries a permanent electrostatic charge. Such sheets can be generated by passing the plastic sheet through an electric field while the sheet is held at an elevated temperature. The sheet is then cooled before the induced electric diople moment generated by the field has time to dissipate. The resulting plastic sheet will stick to most clean surfaces. Furthermore, the sheet may be easily removed and re-applied to another surface.

Electret compositions for making posters have been described in the prior art. Pads of sheets are commercially sold for use during presentations as a replacement for conventional "white boards". These sheets are typically made from polypropylene which is a few thousandths of an inch thick.

The sheets may be printed via conventional offset printing techniques provided they are re-charged after the printing process. Offset printing systems heat the sheets after the application of the ink to dry the ink. The increase in temperature results in a loss of some or all of the induced dipole moment in the sheet. U.S. Pat. No. 5,477,784 entitled "Apparatus and Method for Printing on and Polarizing Polymer Electret Films" describes a printing arrangement in which the sheets are recharged during the drying process. While such recharging systems may be incorporated into large offset presses, they do not represent a viable solution at the desktop publishing level, since they would require modifications of the existing printers to include high voltage charging electrodes.

In principle, electrets should be capable of use with inkjet printers and some color printers which do not subject the electrets to excessive heat. Unfortunately, the electret sheets present a number of problems with respect to the sheet feeders used in these printers. To be cost effective, and to provide reliable adhesion, relatively thin sheets must be used. These sheets are too flexible to feed properly in many paper handling systems. Furthermore, individual sheets in a stack of electrostatically charged sheets in a sheet feeder tend to stick together because of the electrostatic charge. This further complicates the sheet feeding problem.

Broadly, it is the object of the present invention to provide an improved printing material that incorporates the advantages of electrets.

It is another object of the present invention to provide a printing material that may be printed in conventional computer printers without suffering from the paper feed problems described above.

These and other objects of the present invention will become apparent to those skilled in the art from the following detailed description of the invention and the accompanying drawings.

SUMMARY OF THE INVENTION

The present invention is a printing composition that is adapted for printing on computer printers and the like. The printing composition includes a backing sheet and a printing sheet. The printing sheet includes an electret which is reversibly bound to the backing sheet. In one embodiment of the invention, the printing sheet is coated with an ink absorbing coating. The electret can be constructed from materials such as polypropylene or polyethylene that have been subjected to electrostatic fields.

BRIEF DESCRIPTION OF THE DRAWINGS

FIG. 1 is an exploded view of a printing composition according to present invention.

DETAILED DESCRIPTION OF THE INVENTION

To simplify the following discussion, the manner in which the present invention achieves its advantages will be discussed with reference to polyester or polypropylene films. Polyester films that have been coated to provide an ink absorbent surface for printing in inject printers are known to the printing arts. This material is used in conventional printing presses to generate posters and packaging materials.

For example, polyester film with an acrylic coating suitable for printing may be obtained from Apollo Presentation Products, Ronkonkoma, N.Y. 11779. Similar films are sold for generating transparencies using inkjet printers. However, these films tend to be two thick to provide optimal electrostatic adhesion, since the weight to surface area ratio of the films is too great. In addition, the cost of these films is relatively high. Polypropylene films have been found to be suitable for printing in color printers that utilize wax transfer or dye sublimation processes.

The present invention is based on the observation that coated polyester sheets of this type may be charged by placing the sheets in an electric field which is typically 10,000 volts/cm. The sheets may be heated to increase the remnant electric field. In the preferred embodiment of the present invention, a polyester film having a thickness between 0.001 inches and 0.004 inches is passed between rollers and subjected to an electric field and corona discharge to charge the film. This film is then backed with a paper sheet 14 as shown in FIG. 1 which is an exploded view of a printing composition 10 according to the present invention. Backing sheet 14 is preferably attached along one edge to electret sheet 12 by a layer of adhesive 15 which covers less than 10 percent of the area of the electret sheet.

In one embodiment of the present invention, a perforation 17 is included between the portion of the electret sheet attached via the adhesive and the remainder of the electret sheet. This embodiment of the present invention is particularly well suited for "pull-outs" that are included in magazines and the like. After printing, the portion of the sheet that includes the glue is bound into the magazine. The reader can then remove the printed electret sheet by tearing the sheet along the perforations.

The electret sheets of the present invention are also well suited for printing in other types of presses that utilize rolls of material. The backing sheet provides the dimensional stability needed during the printing process. Without the backing sheet, the thin electret sheet would be distorted by the printer rollers and other materials moving parts of the printer. In some environments, the electrostatic adhesion of the electret to the backing sheet is sufficient to prevent the two sheets from moving with respect to one another. In the embodiments that utilize the adhesive sections as shown in FIG. 1, the combined backing sheet and electret are bound at periodic intervals in the roll by the adhesive bound sections. Accordingly, the two layers remain fixed with respect to one another as they pass through the press.

The top surface of the polyester film is coated to absorb ink as shown at 16. This coating is not needed for polypropylene films that are to be printed via wax transfer, dye sublimation or offset printing. This surface remains exposed for printing. The backing sheet 14 separates the charged polyester sheet 12 from the other sheets in the paper feeder.

The optimal thickness for the backing sheet is determined by the thickness of the electret sheet and the optimal thickness for the sheet feeder on the printer. Most printers are designed for a maximum sheet thickness. The combined thickness of the electret sheet and the backing sheet must be less than this maximum thickness. The minimum thickness for the backing sheet is determined by the degree of rigidity required by the paper feed of the printer. Thicker backing sheets provide higher degrees of rigidity; however, thicker backing sheets increase cost. In the preferred embodiment of the present invention, the thickness of the backing sheet is chosen such that the combined thickness of the backing sheet and the electret sheet is close to the optimal thickness for the printer feed mechanism. For example, in one preferred embodiment of the present invention the electret sheet consists of a 2.5 mil sheet of polypropylene backed with a 5 mil sheet of paper. Such a composition has been shown to be suitable for printing in color printers such as the Tektronix 350 printer.

Polyester embodiments of the present invention in which a 0.3 mil polyester sheet is backed with a 5 mil sheet of paper have been found to be suitable for printing in inkjet printers, provided the sheet is coated with an ink absorbing material such as the coatings used on view graph sheets that are sold for use in such printers.

A suitable coating material for polypropylene sheets can be constructed as follows. Polyvinyl acetate (0.3 grams) is dissolved in 1.12 grams of methylene chloride. A second solution consisting of 0.57 grams of polyvinyl alcohol dissolved in the 20.6 grams of water is then mixed with this solution and 0.34 grams of dry pyrylium husk fiber. The resulting solution is spread over the polypropylene sheets and vacuum dried.

It should be noted that thin plastic sheets that have been coated tend to curl when removed from the backing sheet if only one side of the sheet has been coated. Accordingly, in the preferred embodiment of the present invention, the plastic sheets are coated on both sides to prevent this curling.

In addition to reducing inter-sheet adhesion in the printer tray, backing sheet 14 permits the use of a significantly thinner electret sheet while allowing the sheets to pass through the printer without jamming. It should be noted that the sheets are joined at one edge 17 by an adhesive that will allow the sheets to be separated after printing. While the sheets are only joined at one edge, the electrostatic attraction of the electret sheet and the backing sheet result in the sheets being stuck together over the entire length of the polyester sheet. Hence, the backing sheet can support a thin electret sheet during the printing process in a manner that prevents the thin sheet from moving relative to the backing sheet. Prior to placing the printed sheet on a surface for displaying the printed sheet, the backing sheet is removed.

The ability to use thin electret sheets provides two advantages. First, the cost of a "poster" according to the present invention is mainly the cost of the electret sheet which, in turn, is a function of the thickness of the sheet. Once the sheet is printed, the surface on which it is placed supports the sheet. Hence, there is no need for a thick sheet after the printing process is completed. Thus, for purposes of reducing cost, thin sheets are preferred.

The second benefit of thin sheets is their ability to cling to vertical surfaces. The electrostatic attraction of the sheets to the surface is predominantly a function of the surface charge on the sheet. The force tending to remove a sheet from the surface is the weight of the sheet. It has been found experimentally, that the surface charge is relatively independent of the thickness of the sheet. Hence, thin sheets cling better to vertical surfaces.

While the above described embodiments of the present invention utilize polyester or polypropylene sheets for the electret sheet, other plastics may be utilized for the electret. For example, Teflon, polycarbonate, and vinyl sheets may be used for the electret sheet.

In the preferred embodiment of the present invention, the backing sheet is paper. However, other backing sheet compositions may be used. For example, the surface of the backing sheet that is in contact with the electret sheet may be charged by embedding charges in the surface using a corona discharge. The embedded charge has a polarity opposite to that of the adjacent surface of the electret sheet. Hence, the charge cancels the charge on the adjacent surface while the sheets are in contact. This cancellation further decreases the inter-sheet attraction in the feeder tray of the printer. In addition, the additional charge increases the electrostatic bonding of the electret and bonding sheets. In this embodiment of the present invention, the surface of the backing sheet that is to be charged must comprise a material that will hold the charge. For example, the backing sheet may be constructed from a plastic coated paper.

Various modifications to the present invention will become apparent to those skilled in the art from the foregoing description and accompanying drawings. Accordingly, the present invention is to be limited solely by the scope of the following claims.

What is claimed is:

1. A printing article comprising:

a flexible backing sheet having first and second side, said backing sheet comprising a material having a flexibility greater than that required to pass through the paper feed mechanism of a Tektronix 350 printer; and a printing sheet comprising a sheet of electret having first and second sides, said first side of said sheet of electret being in contact with said first side of said backing sheet, said second side of said sheet of electret being adapted for receiving ink, wherein said backing sheet is thicker than said printing sheet, said backing sheet being manually separable from said printing sheet, and wherein said backing sheet comprises a material different from said printing sheet.

2. A printing article comprising:

a flexible backing sheet having first and second sides; and a printing sheet comprising a sheet of electret having first and second sides, said first side of said sheet of electret being in contact with said first side of said backing sheet, wherein said backing sheet is bonded on said first side to said first side of said sheet of electret said second side of said electret being adapted for receiving ink, said bonded area being less than 10 percent of the area of said sheet of electret and wherein said backing sheet comprises a material different from said printing sheet.

3. A printing article comprising:

a flexible backing sheet having first and second sides; and a printing sheet comprising a sheet of electret having first and second sides, said first side of said sheet of electret being in contact with said first side of said backing sheet, wherein said printing sheet further comprises a line of perforations displaced from one edge thereof by a distance sufficient to allow said edge to be bound to said backing sheet while allowing said sheet to be removed by tearing along said line of perforations and wherein said backing sheet comprises a material different from said printing sheet.

4. The printing article of claim 1 wherein said sheet of electret comprises polypropylene.

5. The printing article of claim 1 wherein said sheet of electret comprises polyethylene.

6. The printing composition of claim 1 wherein said printing sheet is less than 5 mils in thickness.

7. A printing article adapted for printing in a printing apparatus that accepts sheets having a thickness less than a maximum thickness, said printing article comprising:

a flexible backing sheet having first and second sides; and a printing sheet comprising an electrostatically charged sheet having first and second sides, said first side of said printing sheet being in contact with said first side of said backing sheet, wherein said backing sheet is thicker than said printing sheet, wherein said printing sheet is manually separable from said backing sheet, wherein said backing sheet comprises a material different from said printing sheet, and wherein the combined thickness of said backing sheet and said printing sheet is less than said maximum thickness.

8. A printing article comprising:

a flexible backing sheet having first and second side, said backing sheet comprising a material chosen from the group consisting of paper and coated paper; and a printing sheet comprising an electrostatically charged sheet having first and second sides, said first side of said printing sheet being in contact with said first side of said backing sheet, said second side of said printing sheet being adapted for receiving ink, wherein said backing sheet is thicker than said printing sheet, said backing sheet being manually separable from said printing sheet, and wherein said backing sheet comprises a material different from said printing sheet.

* * * * *